United States Patent [19]
Peterson

[11] 3,913,175
[45] Oct. 21, 1975

[54] HAMBURGER PATTY FORMING MACHINE

[76] Inventor: Donald E. Peterson, 7900 S. Le Claire, Burbank, Ill. 60459

[22] Filed: Dec. 19, 1973

[21] Appl. No.: 426,431

[52] U.S. Cl. ........................ 17/32; 425/233; 44/11; 17/45
[51] Int. Cl. ............................................. A22c 7/00
[58] Field of Search .......... 17/32, 45; 44/11, 12, 13; 425/233

[56] References Cited
UNITED STATES PATENTS

| | | | |
|---|---|---|---|
| 534,445 | 2/1895 | Miller | 425/233 |
| 1,757,447 | 5/1930 | Comstock | 17/32 |
| 2,820,247 | 1/1958 | Michaud | 17/32 |
| 2,981,973 | 5/1961 | Elmore | 17/32 |
| 3,335,678 | 8/1967 | Katz | 425/233 |
| 3,691,594 | 9/1972 | Klein | 425/812 |

Primary Examiner—Louis G. Mancene
Assistant Examiner—James D. Hamilton
Attorney, Agent, or Firm—Michael G. Berkman

[57] ABSTRACT

A machine for forming hamburger patties having a generally thickened periphery surrounding a central depression, the latter adapted to be filled with cheese, egg or sauces. An auger-fitted hopper feeds a cylinder and piston assembly which fills an open-faced mold covered by a pneumatically shiftable sheet-like diaphragm. During mold filling, the diaphragm is displaced inwardly into the mold and, after the forming of the patty, the diaphragm moves outwardly serving as an aid in ejecting the patty from the mold for transport to a cooking station.

11 Claims, 11 Drawing Figures

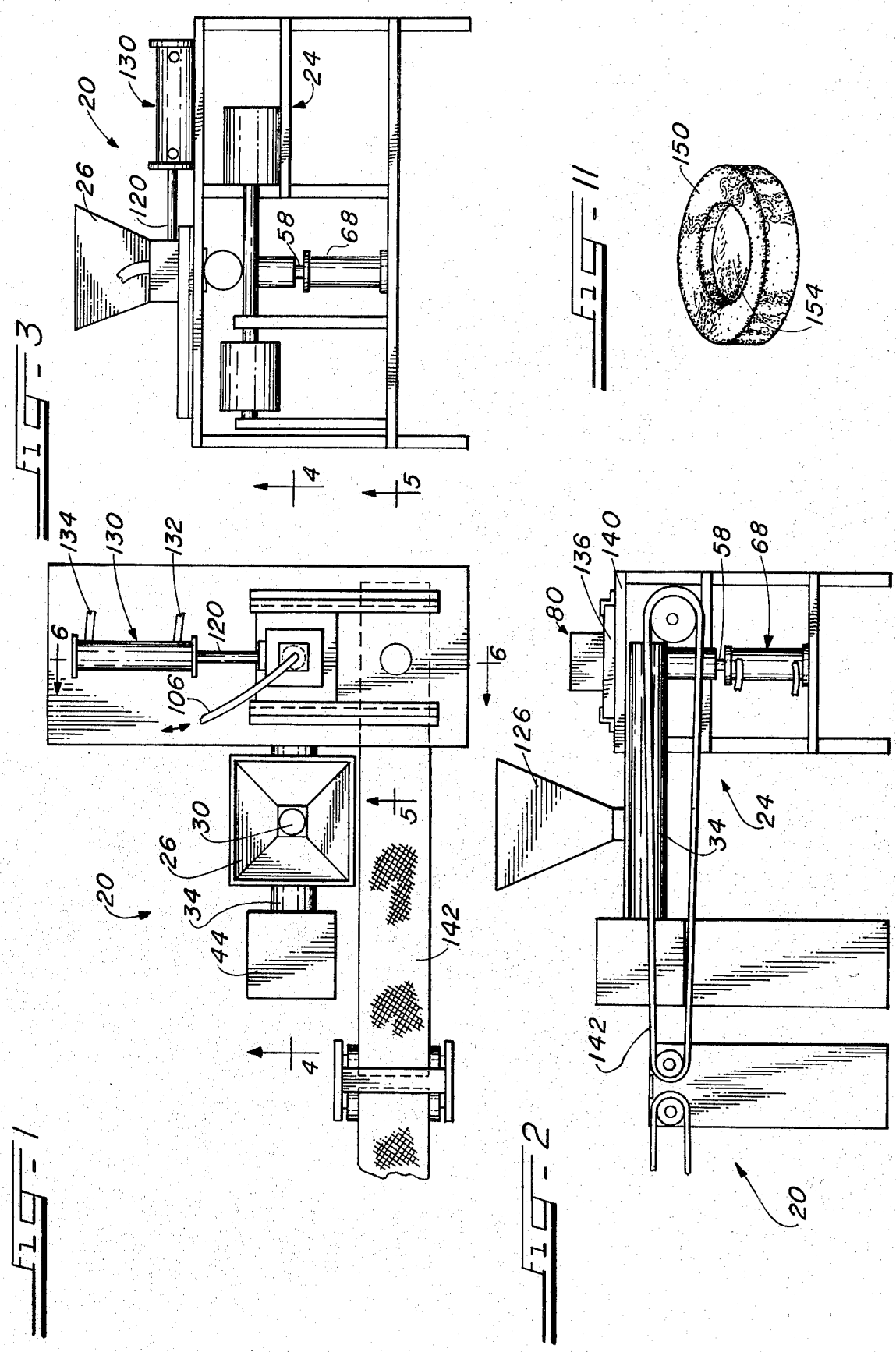

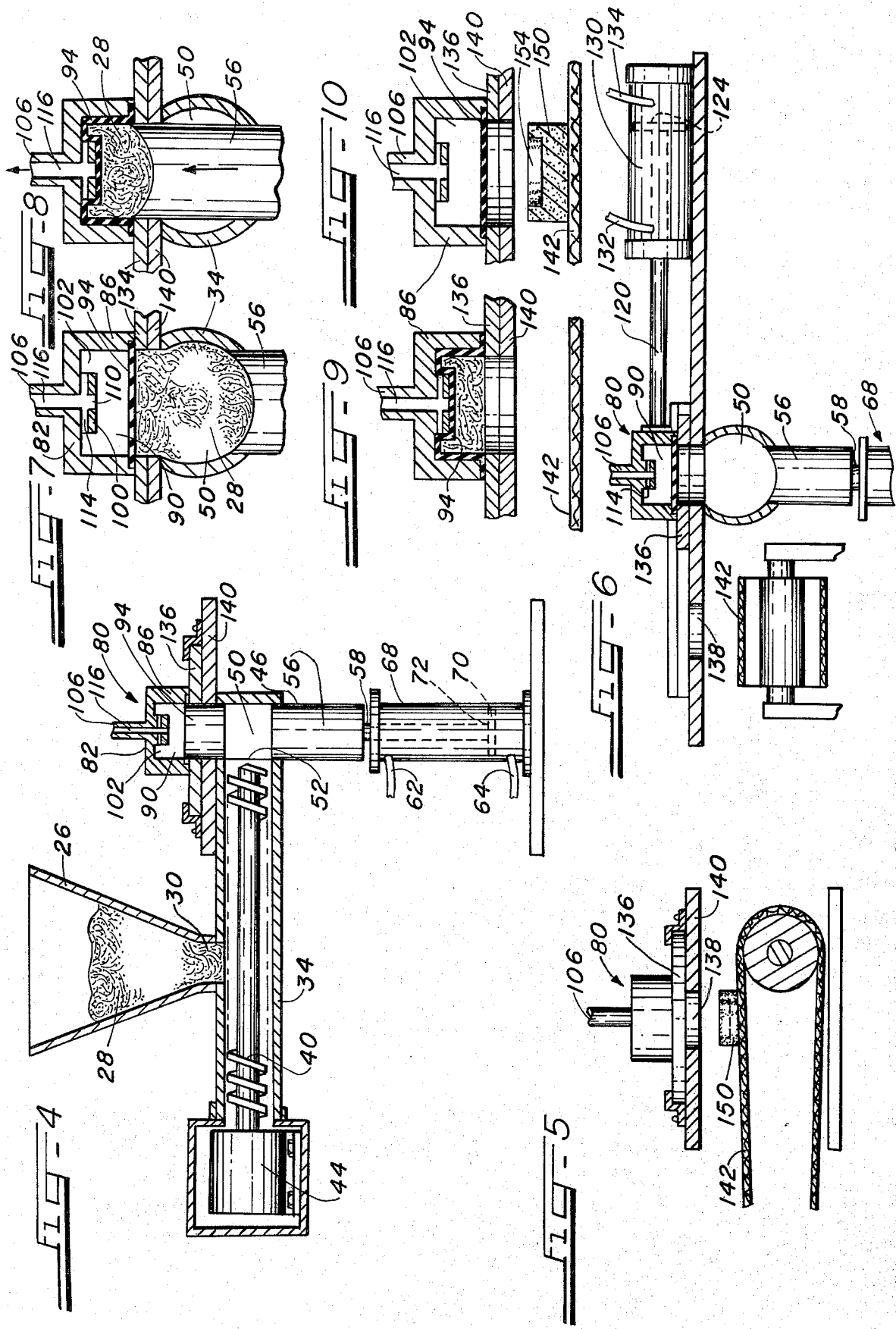

HAMBURGER PATTY FORMING MACHINE

This invention relates to an improved, essentially automatic machine for forming meat patties such as hamburger patties and the like. More particularly, the invention is directed to a machine which forms a hamburger patty having a depressed central zone surrounded by a thickened periphery, the central zone constituting a recess adapted for filling with cheese, egg, sauces, or other edible filling material.

Many types of hamburger forming machines are known in the prior art. However, the problem of producing a substantially completely automatic machine suitable for producing hamburgers and meeting all of the practical requirements of industry as well as the established standards of meat processing and packaging has not heretofore been solved. It is the aim of the present invention to obviate the shortcomings of prior art devices and to provide an improved hamburger patty forming machine which produces a product of improved physical characteristics.

It is a principal object of the invention to provide a hamburger patty forming machine which includes improved apparatus for filling the mold in which the hamburger patty is formed and for ejecting the molded hamburger from the mold itself.

Another object of the invention is to provide, in a hamburger forming machine, apparatus whereby the completed hamburger patty is transferred from the forming machine to a conveyor belt for delivery to an oven, grill, or other cooking station.

A related object of the invention is to provide, in a hamburger patty forming machine, means for producing a patty of a unique configuration including a depressed central zone adapted to receive a filling composition therewithin.

Yet another object of the invention is to provide, in a hamburger patty forming machine, pneumatic means whereby the formed hamburger may be quickly and effectively ejected from the cavity of the mold.

Still another object of the invention is to provide, in a hamburger patty forming machine, vacuum assist means whereby the filling of the hamburger forming mold is facilitated.

A further object of the invention is to provide a hamburger patty forming machine which includes automatically operable apparatus for delivery of the formed hamburger patty onto a conveyor belt for transport to a cooking station.

Another object of the invention is to provide a hamburger patty forming machine having improved hamburger feed and filling apparatus including a hopper-fed auger and a piston-driven mold filler.

A general object of the invention is to provide a hamburger patty molding machine of simple construction and which is easily cleaned in accordance with required procedures.

Other and further objects and advantages of the invention will become apparent from a reading of the following specification taken in conjunction with the drawings in which:

FIG. 1 is a top plan view of the hamburger patty forming apparatus embodying the invention;

FIG. 2 is a front elevational view of the same;

FIG. 3 is an elevational view of the right end of the apparatus of FIG. 1.;

FIG. 4 is an enlarged cross sectional view of the meat transporting components of the apparatus including the hopper fed auger and the piston and cylinder assembly for filling the mold, as indicated by the line 4—4 of FIG. 1;

FIG. 5 is a fragmentary cross sectional view taken on the line 5—5 of FIG. 1 and showing the patty release apparatus and the table opening through which the patty is deposited on the conveyor belt;

FIG. 6 is an enlarged cross-sectional view taken substantially on the line 6—6 of FIG. 1 and showing the meat delivery tube, the mold filling piston assembly, and the table carried reciprocal drive for the patty mold;

FIG. 7 is an enlarged fragmentary cross-sectional view taken vertically through the mold, and indicating diagrammatically the meat filled tube just prior to the meat's being forced against the mold-bridging diaphragm and into the mold;

FIG. 8 is an enlarged fragmentary view similar to that shown in FIG. 7 but after the piston has forced the meat into and filled the mold, against the pressure of the diaphragm;

FIG. 9 is a cross sectional view showing the meat-filled mold just prior to ejection of the meat patty therefrom;

FIG. 10 is a cross-sectional view showing the mold after ejection of the meat patty therefrom and delivery onto the conveyor belt; and FIG. 11 is a perspective view indicating generally the configuration of the hamburger patty of the invention, with its center depression.

The aims and objects of the invention are accomplished by providing in a hamburger patty forming machine integrated means for dispelling controlled quantities of ground meat from a supply hopper, drive means for forceably introducing ground meat into a unique mold provided with pneumatic assists both for the filling of the mold and for the ejection of the molded product therefrom, and means for delivery of the formed and ejected hamburger patty to a conveyor for transport to a cooking station.

Referring more particularly to the drawing, there is shown, in FIGS. 1 through 4, for the purpose of illustrative disclosure, a preferred embodiment of the hamburger patty forming machine of the invention incorporating the teachings thereof. As shown, the components of the hamburger patty forming machine 20 are secured to a structural frame or table 24. A hopper 26 holds the ground meat 28, the hopper 26 being provided with a product discharge port 30 through which the ground meat is delivered into a communicating tubular cylinder 34. A screw or auger 40 extending coaxially within the tube 34 is rotatably driven by a motor 44 to advance the ground meat lengthwise within the tube 34 and to discharge the meat into a transversely extending conduit 46 defining a cylinder-like passage or cavity 50 communicating with the tube 34 at a discharge end 52 thereof. Slidably disposed in the cylindrical chamber 50 is a reciprocable Nylon piston 56 driven by a piston rod 58. Fluid pressure applied through suitable fluid conduits 62 and 64 communicating with a cylinder 68 shifts an internal slide plate 70 secured to an end 72 of the piston rod 58, as indicated schematically in FIG. 4.

Surmounting the chamber 50 is a generally dish-shaped Nylon mold 80 including a top wall 82 integrally joined to a depending annularly disposed skirting wall 86 to define a downwardly opening mold cavity 90 communicating with the chamber 50 whereby ground meat fed from the tube 34 into the chamber 50 may, thereafter, be forced up into the mold 80 by action of the piston 56.

Covering the mouth of the mold 80 is a neoprene sheet or diaphragm 94 fastened to the wall 86 of the mold 80 around the perimeter thereof. The diaphragm 94 is displaceable inwardly into the mold cavity 90 upon application of deforming pressure thereagainst. In the preferred embodiment of the apparatus shown the top wall 82 of the mold 80 is formed with a circular disc or plug 100 extending somewhat into the mold cavity 90 and spaced radially from the mold skirt 86 to provide an annular channel 102 communicating with the principal mold cavity 90. A fluid line 106 is connected to and extends through the top wall 82 of the mold 80 and through the disc or plug 100 terminating in a port 110 communicating with the mold cavity 90. A duct 114 in the plug 100 opening at either end into the cavity 90 intersects a channel 116 in the line 106. The pipe 106 is connected to a pump (not shown) whereby the mold cavity 90 may be pressurized or evacuated, as explained more fully hereinafter.

The mold 80 is shown in FIGS. 1 through 4 and 6 in a position assumed during the mold filling operation. As indicated in FIG. 6, the mold 80 is fastened to a piston rod 120 and piston 124 reciprocally mounted in a cylinder 130 whereby the mold 80 may be shifted, through the application of fluid pressure to control conduits 132 and 134, on a slide plate 136 between the mold loading position shown in FIG. 6 and a position in which the mold 80 is vertically aligned over a product discharge port 138 in the table top 140 for deposit on a conveyor belt 142, the latter being driven by a suitable drive, not shown, for delivery of the discharged hamburger patty 150 to a cooking station for further processing.

It will be appreciated from the foregoing description that the hamburger patty forming machine of the invention produces a meat patty 150 which is shaped so as to provide a recess 154 constituting a depression-like cavity in the hamburger patty and adapted to receive a filling of cheese, egg, sauce or any other preferred filling. For example, in the case of a hamburger five-eighths inch thick, the depth of the depression 154 is preferably about three-eighths inch. The manner in which the machine functions to produce and to discharge the molded patty product is set forth briefly below.

Ground meat 28 is charged into the hopper 26 and, upon energization of the drive motor 44 (FIG. 4) the auger 40 advances the ground meat from the hopper discharge port 30 through the duct 34 into the filling chamber 50. With the chamber 50 filled, fluid pressure is applied to the plate 70 within the cylinder 68 to drive the piston rod 58 and the Nylon piston 56 secured thereto upwardly to force the ground meat from the chamber 50 against the diaphragm 94 to displace the diaphragm inwardly into the cavity 90 of the mold 80 and to fill the mold with ground meat (FIG. 9).

In the preferred embodiment of the invention illustrated, concurrently with the upwardly displacement of the filling piston 56, the mold cavity 90 is evacuated through the pipe 106 and communicating passage 114 to facilitate the filling of the mold and the displacement of the diaphragm 94. The position of the diaphragm just prior to forced intrusion of the ground meat into the mold cavity 90 is shown in FIG. 7. FIG. 8 indicates schematically the forceable introduction of the ground meat into the mold cavity 90 and the simultaneous displacement of the diaphragm 94 to constitute an internal "liner" of the mold itself.

The meat-filled mold 80 is shifted horizontally from the mold filling station (FIG. 4) to a position over the patty discharge port 140 (FIG. 9) which overlies the conveyor belt 142. The evacuation pump (not shown) connected to the conduit 107 is reversed and fluid pressure applied through the conduit 106 (FIG. 9) against the diaphragm 94 forceably to eject the hamburger patty 150 from the mold 80 onto the conveyor belt 142, as indicated schematically in FIG. 10. Thereafter, the patty is conveyed to cooking apparatus such as a deep fat fryer and a finishing oven.

While this invention has been described with reference to preferred embodiments, it will be readily appreciated that various changes and modifications may be made, and it is intended to cover through the present application all such modifications which fall within the true spirit and scope of the appended claims.

What is claimed is:

1. A method of molding a hamburger patty comprising the steps of:
    charging a supply of ground meat into a hopper having a discharge port,
    mechanically advancing the ground meat from the discharge port of the hopper and delivering the meat into a mold packing chamber having a piston and piston rod assembly reciprocably slidable therein,
    driving said piston rod and piston assembly in said chamber to force ground meat from said chamber into a mold cavity having a flexible, pressure-responsive, sheet-like diaphragm covering an open face thereof,
    forcibly displacing said diaphragm inwardly into said mold cavity and packing the mold cavity with meat to form a shaped patty, and
    displacing said diaphragm toward the open end of the mold cavity outwardly thereof and against said patty to eject the formed patty from the mold cavity.

2. The method as set forth in claim 1 and further comprising the step of exhausting fluid from a zone between said diaphragm and walls bounding said mold cavity to establish a differential fluid pressure across the diaphragm during the filling of the mold, thereby to urge the diaphragm inwardly into the mold to facilitate the filling thereof with ground meat.

3. The method as set forth in claim 1 wherein the displacing of said diaphragm to eject the patty from the mold cavity is accomplished by the step of applying fluid pressure to the diaphragm at a face thereof opposed to the patty to urge said diaphragm against the patty and to force the patty outwardly from the mold.

4. The method as set forth in claim 3 and further comprising the step of applying pressure inwardly at a center region of said patty through said diaphragm to form a central depression in said patty, thereby to define a cavity for a filling of food material to be introduced therein.

5. The method as set forth in claim 1 and further comprising the step of depositing the formed patty on a conveyor for delivery to a cooking apparatus.

6. The method as set forth in claim 1 and further comprising the step of shifting the meat-filled mold between a mold filling station and a patty discharge station after filling of said mold and prior to ejection of said patty therefrom.

7. a hamburger patty forming machine comprising:
a hopper adapted to receive and to hold ground meat, and having a meat discharge port,
a mold packing cylinder in communication with said meat discharge port,
drive means and conduit means for transporting ground meat from the port of said hopper to said mold-packing cylinder,
piston means reciprocable in said cylinder,
rod means and means coupling said rod means to said piston means for shifting said piston means axially within said cylinder to force ground meat therethrough and into a mold for filling thereof,
a dish-like mold having an open end in communication with said cylinder for receiving ground meat delivered therefrom,
flexible, pressure-responsive diaphragm means, and means supporting said diaphram means to overlie and to span the open end of said mold,
means for actuating said piston means in said cylinder to discharge ground meat from said cylinder against said diaphragm means to displace said diaphragm means into said mold against bounding walls thereof, thereby to fill said mold with ground meat.

8. The machine as set forth in claim 7 and further comprising fluid pressure generating means and means for introducing fluid pressure into said mold between said diaphragm and walls of said mold to displace said diaphragm outwardly of walls of said mold, thereby to eject the formed hamburger patty therefrom.

9. The machine as set forth in claim 8 and further comprising meat patty shaping means and means for urging said shaping means against a principal face of a hamburger patty formed in said mold to penetrate partially into said patty to produce a depression therein in a center region thereof, said depression being adapted to receive an edible filling preparation therewithin.

10. The machine as set forth in claim 9 wherein said shaping means includes a plate-like mold element formed with a centrally disposed protrusion having a face displaced outwardly from and generally paralleling a base of said mold element and adapted to invade and form a depression in a center region of a hamburger patty contained in said mold.

11. The machine as set forth in claim 7 and further comprising means for evacuating air from a zone between said dish-like mold and said diaphragm means to establish a differential pressure across and to draw said diaphragm means into said mold to facilitate the filling of said mold.

* * * * *